(12) United States Patent
Haase et al.

(10) Patent No.: US 8,700,203 B2
(45) Date of Patent: Apr. 15, 2014

(54) CALIBRATION METHOD FOR A SPHERICAL MEASUREMENT PROBE

(75) Inventors: Andreas Haase, Chemnitz (DE); Holger Kretschmar, Chemnitz (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/401,366

(22) Filed: Feb. 21, 2012

(65) Prior Publication Data

US 2013/0151001 A1    Jun. 13, 2013

(30) Foreign Application Priority Data

Feb. 22, 2011 (EP) .................................... 11155393

(51) Int. Cl.
*G06F 19/00* (2011.01)

(52) U.S. Cl.
USPC ........................................................ 700/192

(58) Field of Classification Search
None
See application file for complete search history.

(56) References Cited

U.S. PATENT DOCUMENTS

| | | | | |
|---|---|---|---|---|
| 7,460,970 | B2 * | 12/2008 | Madlener et al. | 702/94 |
| 2002/0174555 | A1 * | 11/2002 | McMurtry et al. | 33/502 |
| 2003/0009257 | A1 * | 1/2003 | Sutherland et al. | 700/195 |
| 2003/0069709 | A1 | 4/2003 | Noda et al. | |
| 2004/0093179 | A1 * | 5/2004 | Sutherland | 702/104 |
| 2004/0200085 | A1 * | 10/2004 | Sakata et al. | 33/550 |
| 2004/0244464 | A1 * | 12/2004 | Hajdukiewicz et al. | 73/1.79 |
| 2005/0005465 | A1 * | 1/2005 | Taylor et al. | 33/502 |
| 2005/0213108 | A1 * | 9/2005 | McMurtry et al. | 356/609 |
| 2006/0235636 | A1 * | 10/2006 | Madlener et al. | 702/95 |
| 2007/0113417 | A1 * | 5/2007 | McMurtry et al. | 33/561 |
| 2009/0183610 | A1 * | 7/2009 | Maxted et al. | 82/1.11 |
| 2010/0007895 | A1 * | 1/2010 | Yamagata et al. | 356/511 |
| 2010/0018069 | A1 * | 1/2010 | Ould et al. | 33/503 |
| 2010/0250178 | A1 | 9/2010 | Noda et al. | |

FOREIGN PATENT DOCUMENTS

| | | |
|---|---|---|
| CN | 101432592 A | 5/2009 |
| JP | 6195855 A | 5/1986 |
| WO | WO 00/25087 A1 | 5/2000 |
| WO | WO 2007/068912 A1 | 6/2007 |
| WO | WO 2007/125306 A1 | 11/2007 |
| WO | WO 2011/002501 A1 | 1/2011 |

* cited by examiner

*Primary Examiner* — Kavita Padmanabhan
*Assistant Examiner* — Patrick Cummins
(74) *Attorney, Agent, or Firm* — Henry M. Feiereisen LLC

(57) ABSTRACT

Four basic measurements are performed when calibrating a spherical measurement probe fastened to a tool spindle having a fixed longitudinal position along the spindle axis. Moving the measurement probe transversely towards the calibration sphere yields a basic position of the tool spindle relative to an element with an attached calibration sphere, when measurement probe touches the calibration sphere. The measurement probe is rotated about the spindle axis from one basic measurement to the next by the same angle, whereas the orientation of the calibration sphere is maintained for all four basic measurements. Based on the basic positions, a reference position of the tool spindle relative to the element, at which the tool spindle is located above the calibration sphere and the spindle axis goes through a central point of the calibration sphere, is determined and taken into account in further calibration of the measurement probe.

14 Claims, 8 Drawing Sheets

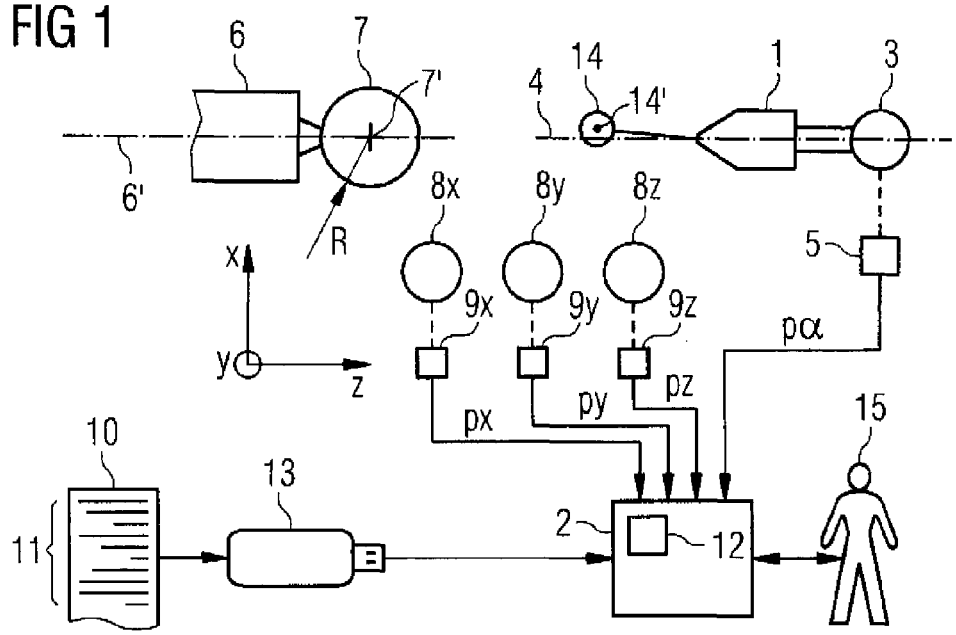

FIG 1

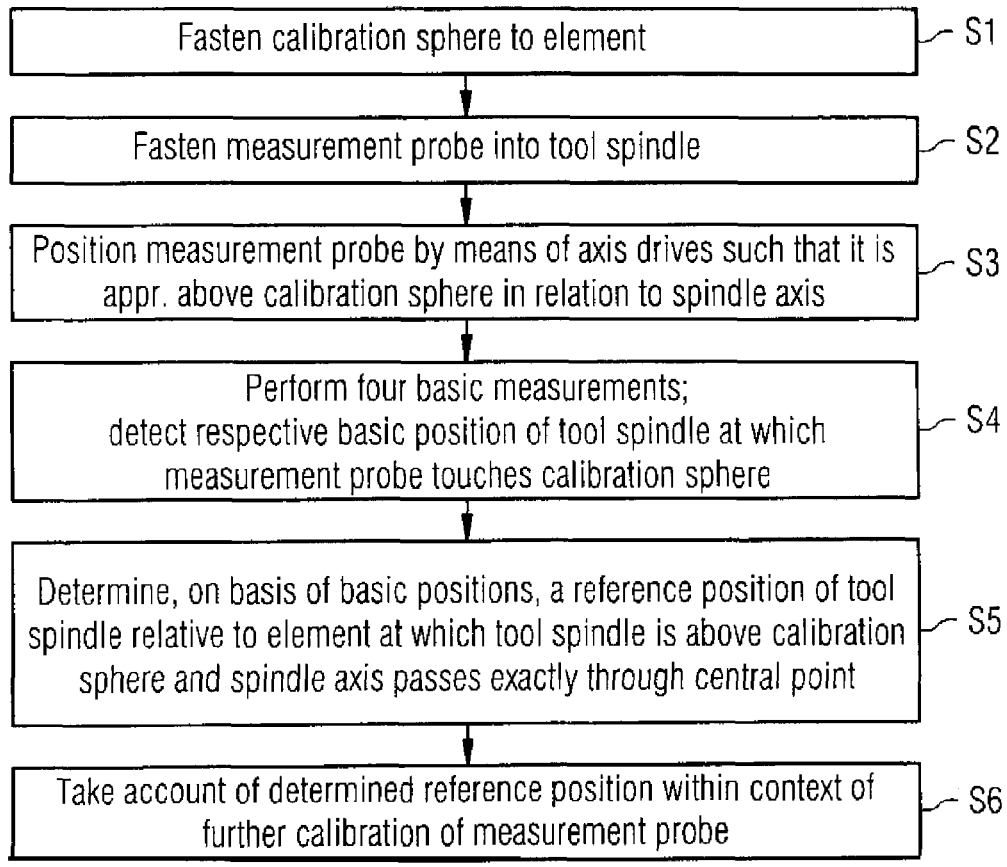

FIG 2

- S1: Fasten calibration sphere to element
- S2: Fasten measurement probe into tool spindle
- S3: Position measurement probe by means of axis drives such that it is appr. above calibration sphere in relation to spindle axis
- S4: Perform four basic measurements; detect respective basic position of tool spindle at which measurement probe touches calibration sphere
- S5: Determine, on basis of basic positions, a reference position of tool spindle relative to element at which tool spindle is above calibration sphere and spindle axis passes exactly through central point
- S6: Take account of determined reference position within context of further calibration of measurement probe

CALIBRATION METHOD FOR A SPHERICAL MEASUREMENT PROBE

CROSS-REFERENCES TO RELATED APPLICATIONS

This application claims the priority of European Patent Application, Serial No. EP11155393, filed Feb. 22, 2011, pursuant to 35 U.S.C. 119(a)-(d), the content of which is incorporated herein by reference in its entirety as if fully set forth herein.

BACKGROUND OF THE INVENTION

The present invention relates to a calibration method for a spherical measurement probe which is arranged in a tool spindle of a machine tool able to be rotated around a spindle axis. The present invention further relates to a computer program having machine code to be executed by a control device for a machine tool to perform the calibration method. The present invention further relates to a control device for a machine tool, with the control device being programmed with such a computer program. The present invention also relates to a machine tool with a control device configured to execute the calibration method.

Various calibration methods are known in the art. However, it would still be desirable and advantageous to obviate prior art shortcomings and to provide an improved method which simplifies a precise calibration of the measurement probe is possible.

SUMMARY OF THE INVENTION

According to one aspect of the present invention, a method for calibrating a spherical measurement probe fastened in a tool spindle of a machine tool and configured for rotation about a spindle axis, includes fastening a calibration sphere to an element of the machine tool, positioning the tool spindle relative to the element of the machine tool with at least three axis drives of the machine tool in three mutually independent translational directions, performing four basic measurements while during all four basic measurements holding the tool spindle constant at an identical longitudinal position, as viewed in a direction of the spindle axis, and holding the calibration sphere constant at the same orientation for all four basic measurements, moving in each basic measurement the measurement probe with the axis drives towards the calibration sphere in a corresponding transverse direction and measuring a corresponding basic position of the tool spindle relative to the element of the machine tool at which the measurement probe touches the calibration sphere, wherein the four transverse directions corresponding to the four basic measurements meet in a plane spanned by the four transverse directions in a common point and are evenly distributed around the common point, rotating the measurement probe with a spindle drive from one basic measurement to a next basic measurement by an identical angle about the spindle axis, wherein the identical angle corresponds to an angle between the respective transverse directions with one another, determining based on the basic positions a reference position of the tool spindle above the calibration sphere relative to the element at which the spindle axis extends through a center point of the calibration sphere, and taking the determined reference position into account in a further calibration of the measurement probe.

Although the measurement probe is rotated around the spindle axis by the spindle drive from one basic measurement to the next basic measurement by the same angle which the respective transverse directions make with one another, while the calibration sphere is kept constant for all four basic measurements with the same orientation, the reference position can be determined with high precision. It is irrelevant how the calibration sphere is disposed in relation to a reference location of the element of the machine tool. It is also irrelevant whether the calibration sphere is disposed centered to the spindle axis of the workpiece spindle or not, for example when the element is a workpiece spindle of the machine tool.

According to an advantageous feature of the present invention, the accuracy in the determination of the central point of the calibration sphere and thus the reference position may be improved if the radius of the calibration sphere is known, by.
  before the four basic measurements, moving the measurement probe with the axis drives in the longitudinal direction of the spindle axis towards the calibration sphere and measuring an early contact position of the tool spindle relative to the element of the machine tool at which the measurement probe touches the calibration sphere, and
  for performing the four basic measurements, moving the measurement probe, starting from the early contact position, by the radius of the calibration sphere, plus a sufficient offset, transversely to the longitudinal direction of the spindle axis and by the radius of the calibration sphere plus an estimated radius of the measurement probe in the longitudinal direction towards the calibration sphere.

According to another advantageous feature of the present invention, the accuracy in the calibration of the measurement probe may be improved even further by
  after the determination of the reference position, moving the tool spindle with the axis drive to the reference position, thereafter moving the measurement probe with the axis drive in the longitudinal direction of the spindle axis up to the calibration sphere and detecting a late contact position of the tool spindle relative to the element of the machine tool, at which the measurement probe touches the calibration sphere, and
  taking the late contact position into account in the further calibration of the measurement probe.

According to yet another advantageous feature of the present invention,
  four additional measurements may be performed after the determination of the reference position,
  the calibration sphere may be held constant during all four additional measurements at the same orientation as for the basic measurements,
  for each additional measurement, the measurement probe may be moved with the axis drives in a corresponding one of the four transverse directions towards the calibration sphere and a respective additional position of the tool spindle relative to the element of the machine tool may be detected, at which the measurement probe touches the calibration sphere,
  the measurement probe may be held constant during all four additional measurements by the spindle drive at the same orientation, and
  the four additional positions may be taken into account in the further calibration of the measurement probe.

According to another advantageous feature of the present invention, both the late contact position and also the four additional positions may be determined by
  performing the four additional measurements after the determination of the late contact position and for performing the four additional measurements, moving the measurement probe, starting from the late contact position, with the axis drives by the radius of the calibration sphere plus a sufficient offset transversely to the longitudinal direction of the spindle axis and by the radius of the calibration sphere plus an estimated radius of the measurement probe in the longitudinal direction towards the calibration sphere.

According to another advantageous feature of the present invention, within the context of the further calibration of the measurement probe, the additional positions may be taken into account by determining, based on the four additional positions, the actual radius of the measurement probe and its offset relative to the spindle axis.

According to an advantageous feature of the present invention, the radius of the measurement probe and its offset relative to the spindle axis can be used to, for example, after determination of the actual radius of the measurement probe and its offset relative to the spindle axis, move the tool spindle with the axis drives to a position at which the measurement probe is located centrally over the calibration sphere, thereafter move the measurement probe with the axis drives in the longitudinal direction of the spindle access towards the calibration sphere and detect a last contact position of the tool spindle relative to the element of the machine tool at which the measurement probe touches the calibration sphere, and based on the last contact position, determine the length of the element as viewed in the direction of the spindle axis.

Alternatively or in addition, after the determination of the actual radius of the measurement probe and its offset relative to the spindle axis, the measurement probe may be moved with the axis drives in the longitudinal direction of the spindle axis such that a connecting line connecting the central points of measurement probe and calibration sphere runs orthogonally to the spindle axis, the four additional measurements may then be repeated, and the four new additional positions may be taken into account in the further calibration of the measurement probe.

This approach leads to particularly precise results.

According to another aspect of the invention, a computer program stored on a non-transitory medium and including machine code which, when loaded into a control device for a machine tool and executed by the control device, causes the control device to perform a calibration method for calibrating a spherical measurement probe, which is fastened in a tool spindle of a machine tool and configured for rotation about a spindle axis, with a calibration sphere attached to an element of the machine tool, with the calibration method including the aforedescribed method steps.

According to another aspect of the invention, a control device for a machine tool, wherein the control device is programmed with a computer program stored on a non-transitory medium and including machine code which, when loaded into a control device for a machine tool and executed by the control device, causes the control device to perform a calibration method for calibrating a spherical measurement probe, which is fastened in a tool spindle of a machine tool and configured for rotation about a spindle axis, with a calibration sphere attached to an element of the machine tool, with the calibration method including the aforedescribed method steps.

According to yet another aspect of the invention, a machine tool includes a tool spindle, a spindle drive constructed to rotate the tool spindle around a spindle axis, an element carrying a calibration sphere, at least three axis drives for positioning the tool spindle relative to the element in three mutually independent translational directions, position sensors assigned to the axis drives and configured to detect a position of the tool spindle relative to the element, and a control device configured to perform the steps of the aforedescribed calibration method for calibrating the calibration sphere.

According to an advantageous feature of the present invention, the machine code can be executed by the control device, wherein the control device automatically performs at least the four basic measurements with the inventive calibration method, determines the reference position and takes the reference position into account in the further calibration of the measurement probe.

The computer program may be stored in machine-readable form on a data medium. The data medium may, for example, be embodied as a mobile data medium. Typical examples of mobile data media are USB memory sticks, SD memory cards, CD-ROMs etc. Alternatively, the data medium may be embodied as an integral component of the control device.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a schematic diagram of a machine tool,

FIG. 2 shows a flow diagram of a calibration process according to the present invention.

DETAILED DESCRIPTION OF PREFERRED EMBODIMENTS

Figure 3:
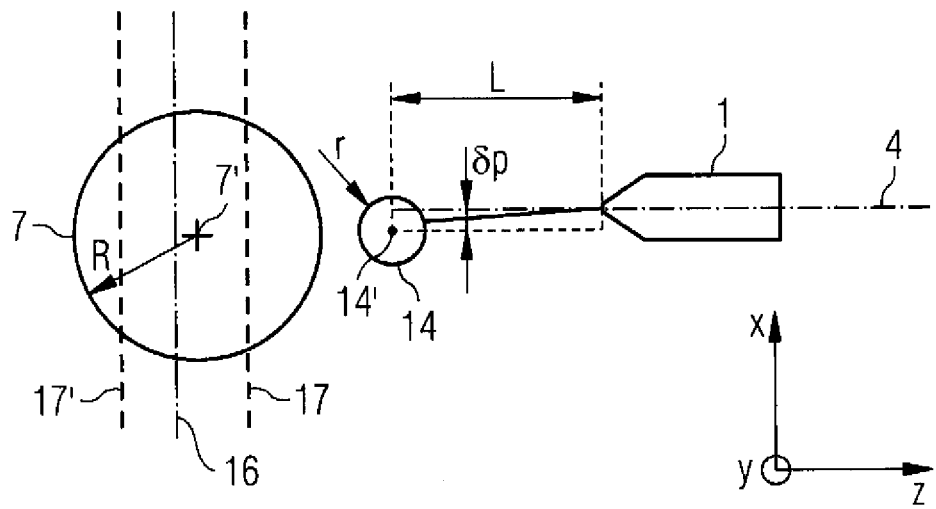
FIG. 3 shows a detail from FIG. 1.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a machine tool with a machine tool spindle 1. The machine tool spindle 1—controlled by a control device 2 of the machine tool—is able to be rotated by a spindle drive 3 around a spindle axis 4. The machine tool spindle 1 is rotated under positional control. The spindle drive 3 is assigned a position generator 5, by means of which a corresponding position signal pα is able to be detected and which is connected to the control device 2 for transferring the position signal pα.

The machine tool also has an element 6. This element 6 can for example involve a workpiece holder 6 of the machine tool. The workpiece holder 6 can be rotatable around a workpiece axis 6'. This is however of secondary importance. The decisive factor is that the element 6 is embodied such that a calibration sphere 7—i.e. a sphere with a defined and preferably known radius R—is able to be fastened to it.

The machine tool also has (at least) three axis drives 8x, 8y, 8z by means of which the machine tool spindle 1 is able to be positioned in three translational directions x, y, z independent of one another relative to the element 6. Within the context of the present invention it is a matter of the relative movement of the machine tool spindle 1 relative to the element 6. Whether the machine tool spindle 1 is moved relative to a base body of the machine tool and the element 6 is held in a fixed position or vice versa or whether the movement is split between the machine tool spindle 1 and the element 6 is of secondary importance.

The machine tool spindle 1—controlled by the control device 2—is positioned in a controlled manner. The axis drives 8x, 8y, 8z are assigned position generators 9x, 9y, 9z by means of which corresponding position signals px, py, pz are able to be detected and which are connected to the control device 2 for transfer of the position signals px, py, pz. The totality of the position signals px, py, pz is characteristic of the position p of the machine tool spindle 1 relative to the element 6.

It is possible, in accordance with the diagram shown in FIG. 1, for one of the translational directions x, y, z—here the direction z—to run in parallel to the spindle axis 4. In this case, the two other of the directions x, y, z—here the directions x and y—preferably run orthogonal to the spindle axis 4. In the event of the element 6 also being able to be rotated around an axis 6', it is also possible in a similar manner for one of the directions x, y, z to run parallel to this axis 6' and for the two other of the directions x, y, z to run orthogonally to this axis 6'. Furthermore the aforementioned axis 6' around which the element 6 is able to be rotated and the spindle axis 4 can run in parallel. These embodiments are not mandatory however. In principle any given orientations of the directions x, y, z relative to the spindle axis 4 and if necessary also relative to the axis 6' around which the element 6 is able to be rotated are possible. It is also not absolutely necessary for the spindle axis 4 to be produced at a specific angle (for example 0° or 90°) relative to the axis 6' around which the element 6 is able to be rotated. Any given orientation is possible and permissible.

The control device 2 is generally embodied as a software-programmable control device. The method of operation of the control device 2 is thus determined by a computer program 10 with which the control device 2 is programmed.

The computer program 10 comprises machine code 11 which is able to be executed directly by the control device 2. The computer program 10 can be stored on a data medium 12 in machine-readable—especially electronic—form. For example the data medium 12 can be embodied as an integral component of the control device 2. As an alternative or in addition the computer program 10 can be stored on another data medium 13 in machine-readable form. In particular the other data medium 13 can be embodied as a mobile data medium (USB memory stick, SD memory card, CD-ROM, . . . ), which for example will be temporarily connected to the control device 2 for executing the computer program 10 or for transferring it into the control device 2.

As a result of the programming of the control device 2 with the computer program 10 the control device 2 is able, inter alia, to carry out normal operation. For example the control device 2 in normal operation can control the machine tool so that a workpiece (not shown) is processed in the desired manner. Normal operation is of secondary importance within the context of the present invention and is thus not explained in greater detail. The decisive factor is merely that, for implementation of the desired processing within the framework of normal operation, the machine tool spindle 1 must be positioned exactly at the desired target position relative to the element 6. For this purpose an exact calibration of the machine tool spindle 1 relative to the element 6 is required. For an exact calibration of the machine tool spindle 1 relative to the element 6, an exact calibration of the elements to be used for calibration is required in its turn. The elements used for calibration of the machine tool spindle 1 relative to element 6 are on the one hand the calibration sphere 7 already mentioned, on the other hand a measurement probe 14.

The machine tool spindle 1 is calibrated relative to element 6 in a calibration mode of the machine tool. As a result of the programming of the control device 2 with the computer program 10 the control device 2 is likewise able to operate the machine tool in calibration mode.

In calibration mode the measurement probe 14 is initially calibrated, and then the machine tool spindle 1 is calibrated relative to element 6. The calibration of the machine tool spindle 1 relative to element 6 with an already calibrated measurement probe 14 is known per se. Thus the calibration of the measurement probe 14 will be explained in greater detail exclusively in the further figures—initially FIG. 2.

In accordance with FIG. 2, initially in a step S1, the calibration sphere 7 is fastened to the element 6 of the machine tool. Furthermore in accordance with FIG. 2, in a step S2, the measurement probe 14 is fastened in the machine tool spindle 1. The measurement probe 14 is embodied in a spherical shape in accordance with FIG. 1. It is embodied as a so-called switching measurement probe.

The fastening of the calibration sphere 7 and/or the fastening of the measurement probe 14 can be undertaken manually by an operator 15 of the machine tool (see FIG. 1). As an alternative it can be carried out in an automated manner by the control device 2. The order of the steps S1 and S2 is interchangeable.

Furthermore the measurement probe 14 in a step S3 is positioned by means of the axis drives 8x, 8y, 8z such that it is roughly above the calibration sphere 7 in relation to the spindle axis 4, see FIG. 3. This drive movement can be automated by the control device 2 or carried out under the control of the operator 15.

The measurement probe 14, as shown in FIG. 3 and assumed subsequently, can be positioned in one of the translational directions x, y, z—here the direction z—of the machine tool. This is however not mandatory. As an alternative positioning from any given direction as possible. If necessary an appropriate coordinate transformation must have been carried out. Carrying out a coordinate transformation is a generally known and standard practice to persons skilled in the art and does not therefore have to be explained here in greater detail.

A calibration cycle is started at the latest now, i.e. when the measurement probe 14 is arranged approximately above the calibration sphere 7. In the calibration cycle the control device 2—based on the programming with the computer program 10—automatically executes a measurement cycle which is further explained below in conjunction with FIG. 2. During the entire measurement cycle only the measurement probe 14 is positioned relative to the calibration sphere 7 in the three translational directions x, y, z and if necessary the machine tool spindle 1 (and with it the measurement probe 14) is rotated around the spindle axis 4. The calibration sphere 7 is however not moved rotationally. It is thus held constantly for all subsequent measurements at the same orientation. This applies both to the basic measurements explained below and also to the additional measurements explained below.

In accordance with FIG. 2 the control device 2 performs four basic measurements in a step S4. In all four basic measurements the tool spindle 1 is held constantly at the same position viewed in the direction of the spindle axis 4, for example such that a central point 14' of the measurement probe 14 is driven exclusively in that plane 16 which is shown in FIG. 3 by a dotted and dashed line. The precise position of the plane 16 is secondary if it only lies approximately in the vicinity of the central point 7' of the calibration sphere 7. The plane 16 could thus—purely by way of example—alternatively coincide with one of the two dashed lines 17, 17' or lie somewhere between these two lines 17, 17'.

Figure 4:
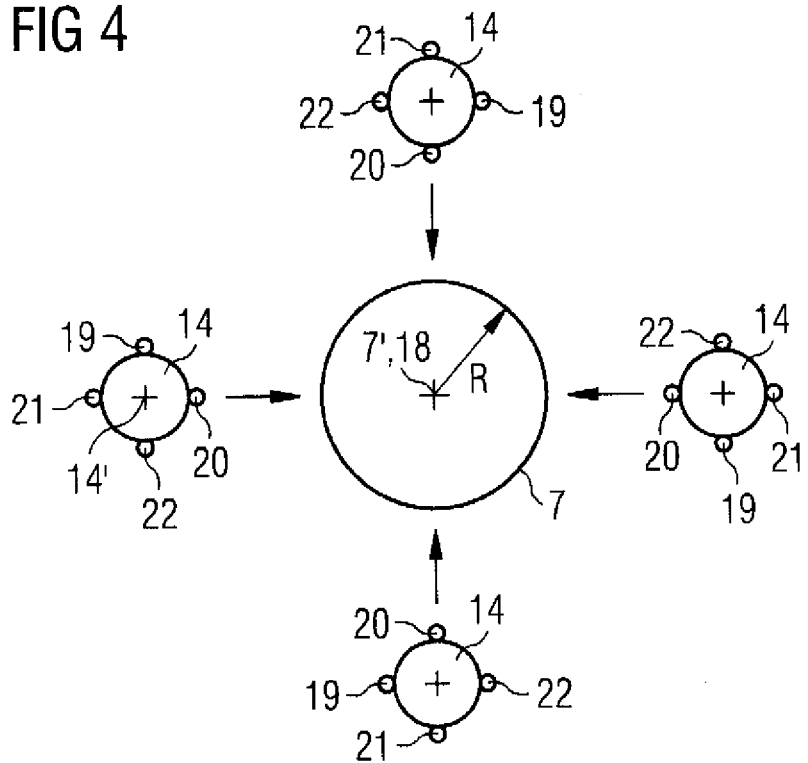
FIG. 4 shows a sectional plane.

For each basic measurement the measurement probe 14 in accordance with FIG. 4 is driven in a respective transverse direction towards the calibration sphere 7. FIG. 4 shows the four transverse directions which are identified in FIG. 4 by corresponding arrows. The tool spindle 1 is driven until the measurement probe 14 is touching the calibration sphere 7; the measurement probe 14 thus operates. The respective position p of the tool spindle 1 detected at this point in time—referred to below as the respective basic position—is stored by the control device 2.

The spindle axis 4 runs by definition orthogonally to the plane 16 which is spanned by the transverse directions. The drive movements of the tool spindle 1 during the four basic measurements thus define a line in each case in the observed plane 16. The extensions of the lines—i.e. the resulting four transverse directions—meet at a common point 18. They are evenly distributed around this point 18.

The statements made in relation to the plane 16 above are independent of where along the spindle axis 4 the plane 16 runs. It can thus be assumed, without limiting the generality, that the plane 16 contains the central point 7' of the calibration sphere 7. As an alternative the central point 7' of the calibration sphere 7 can be mapped by means of a parallel projection, which runs parallel to the spindle axis 4 in the plane 16.

In the ideal case the common intersection point 18 of the transverse directions is identical to the central point 17 of the calibration sphere 7. As an alternative an offset exists between the intersection point 18 and the central point 7'. This is however readily acceptable, provided—within the observed plane 16—the space between the central point T and the intersection point 18 is relatively small. This condition is however to be easily fulfilled since the calibration sphere 7 as a rule has a significant radius R—for example around 20 mm to around 80 mm—and the manual or automated pre-adjustment of the step S3 is readily possible to a precision of within a few mm.

In the diagram depicted in FIG. 4 the measurement probe 14 is provided with four markings 19 to 22. It is possible for the markings 19 to 22 to be a component of the real, physically-present measurement probe 14. This is however not necessary. The markings 19 to 22 merely serve to enable further features of the present invention to be better explained. The markings 19 to 22 are distributed evenly over the circumference of the measurement probe 14.

As can be seen from FIG. 4, with each of the four basic measurements, the same marking 20 of the measurement probe 14 faces towards the calibration sphere 7. The measurement probe 14 is thus rotated in each case by means of the spindle drive 3 from basic measurement to basic measurement by the same angle around the spindle axis 4 which the respective transverse directions of the two basic measurements form with one another. In all four basic measurements the measurement probe 14 thus touches the calibration sphere 7—at least essentially—with the same point of the measurement probe 14, ideally with marking 20. Any measurement errors which can arise from a not completely flush fastening of the measurement probe 14 in relation to the spindle axis 4 or a non-roundness of the measurement probe 14 are thus always possibly present for all four basic measurements, however always have the same amount and the same leading sign.

In a step S5 the control device 2 determines on the basis of the basic positions a reference position p* of the tool spindle 1 relative to the element 6. The control device 2 determines the reference position p* such that the spindle axis 4, in the event of the tool spindle 1 being positioned at the reference position p*, passes (exactly) through the central point 7' of the calibration sphere 7.

In a step S6 the control device 2 takes into account the determined reference position p* within the framework of the further calibration of the measurement probe 14.

The precision in the determination of the reference position p* is all the better, the smaller is the distance from the plane 16 to the central point 7' of the calibration sphere 7. Since the radius R of the calibration sphere 7 is known in advance as a rule, the procedure from FIG. 2 can be improved by an embodiment which is explained below in greater detail in conjunction with FIGS. 5 and 6.

Figure 5:
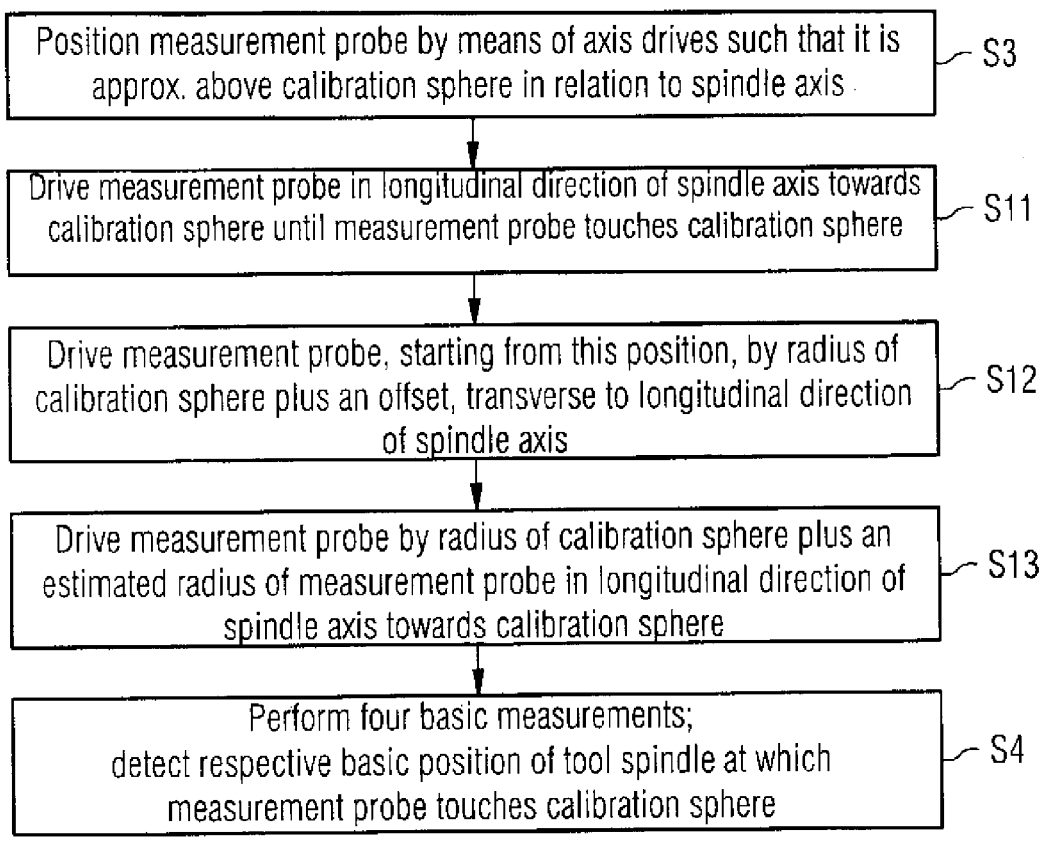
FIG. 5 shows an additional flow diagram of the calibration process according to the present invention.

In accordance with FIG. 5 steps S11 to S13 are inserted between steps S3 and S4. Steps S11 to S13, where they are present, are already carried out automatically by the control device 2, are thus components of the calibration cycle.

In step S11 the measurement probe 14 is driven by the control device 2 by means of the axis drives 8x, 8y, 8z in the longitudinal direction of the spindle access 4 towards the calibration sphere 7 until the measurement probe 14 is touching the calibration sphere 7. This position of the tool spindle 1—called the early contact position below—is detected and fed to the control device 2.

To carry out the four basic measurements the measurement probe 14 is then, in step S12, starting from the early contact position, driven by the radius R of the calibration sphere 7 plus a sufficient offset transverse to the longitudinal direction of the spindle axis 4. Furthermore the measurement probe 14, in step S13, is driven by the radius R of the calibration sphere 7 plus an estimated radius r of the measurement probe 14 in the longitudinal direction of the spindle axis 4 towards the calibration sphere 7. This procedure guarantees that a distance between the plane 16 and the central point 7' of the calibration sphere 7 is already relatively small during the basic measurements (see FIG. 6).

Figure 7:
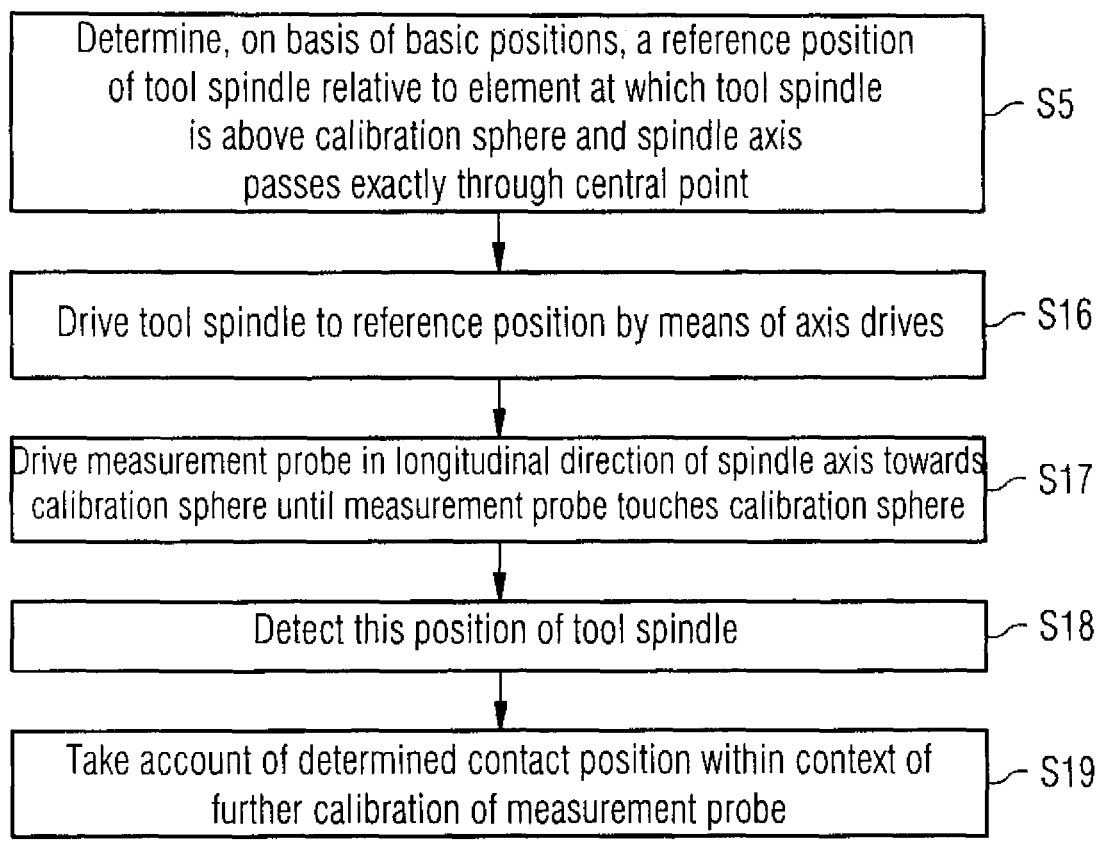
FIG. 7 shows an additional flow diagram of the calibration process according to the present invention.
Figure 8:
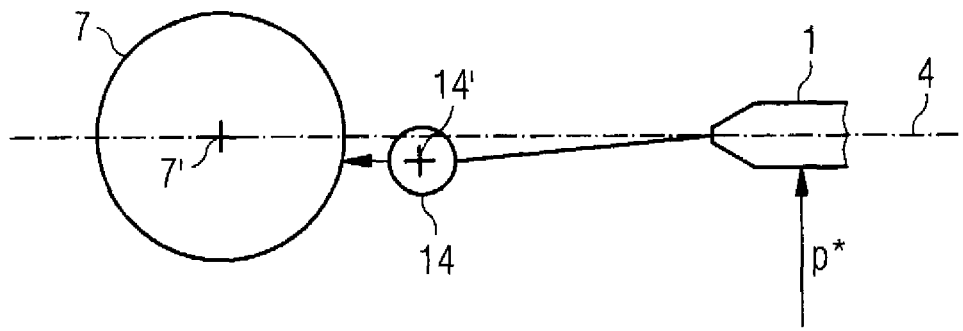
FIG. 8 shows a diagram similar to the diagram of FIG. 3.

Within the context of taking account of the reference position p* in the further calibration of the measurement probe 14 (=step S6 in FIG. 2) the control device 2 can in accordance with FIGS. 7 and 8 for example drive the tool spindle 1 in a step S16 by means of the axis drives 8x, 8y, 8z to the reference position p*, see FIG. 8. Then the measurement probe 14 in accordance with FIG. 7 in a step S17—see the corresponding arrow in FIG. 8—is driven in the longitudinal direction of the spindle axis 4 towards the calibration sphere 7, until the measurement probe 14 is touching the calibration sphere 7. This position p of the tool spindle 1—called the late contact position below—is detected in a step S18.

In a subsequent step S19 the control device 2 takes account of the late contact position in the further calibration of the measurement probe 14.

Figure 6:
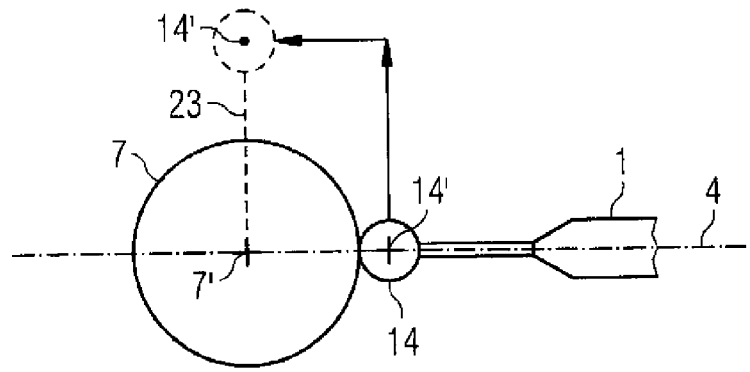
FIG. 6 shows a diagram similar to the diagram of FIG. 3.

For good order's sake it should be mentioned that the difference between the procedure of FIGS. 5 and 6 and the procedure of FIGS. 7 and 8 consists of the position of the central point 7' of the calibration sphere 7 not yet being known in FIGS. 5 and 6 and the positioning of the measurement probe 14 thus possibly not being entirely correct.

As can be seen from FIG. 3, it can occur that the measurement probe 14 (in precise terms its central point 14') is not exactly centered in relation to the spindle axis 4 but has an offset δp. Such an offset δp can especially cause measurement errors which are problematic subsequently in the calibration of the tool spindle 1 relative to the element 6. Also the precise radius r of the measurement probe 14 is not yet known. In a preferred embodiment of the present invention, four additional measurements are thus carried out in accordance with FIGS. 9 and 10 after the determination of the reference position p* in a step S21. As with the basic measurements, for the additional measurements too, the measurement probe 14 is driven by means of the axis drives 8x, 8y, 8z in one of the four transverse directions in each case towards the calibration sphere 7, until the measurement probe 14 is touching the calibration sphere 7. The additional position of the tools spindle 1 detected in each case at this point relative to the element 6 of the machine tool is detected by the control device 2 in a step S22 and also stored by the control device 2. The difference between the basic measurements and the additional measurements lies in the fact that the measurement probe 14 for the additional measurements is held by means of the spindle drive 3 for all four additional measurements constantly at one and the same—in principle random—orientation. Whereas the measurement probe 14 is rotated as well for the basic measurements, this is not the case for the additional measurements.

The four additional positions detected for the additional measurements are taken into account by the control device 2 in a step S23 in the further calibration of the measurement probe 14. In particular the control device 2—see step S23 in FIG. 9—can determine on the basis of the four additional positions the actual radius r of the measurement probe 14 and its offset δp relative to the spindle axis 4. The radius r of the measurement probe 14 and its offset δp relative to the spindle axis 4 represent important calibration variables of the measurement probe 14.

Figure 9:
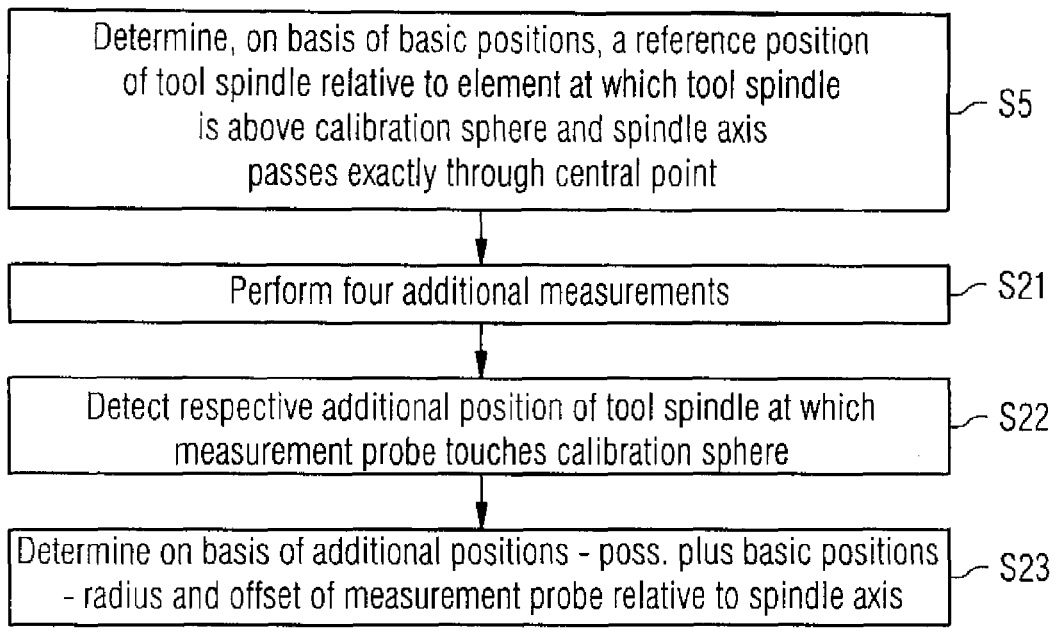
FIG. 9 shows an additional flow diagram of the calibration process according to the present invention.
Figure 10:
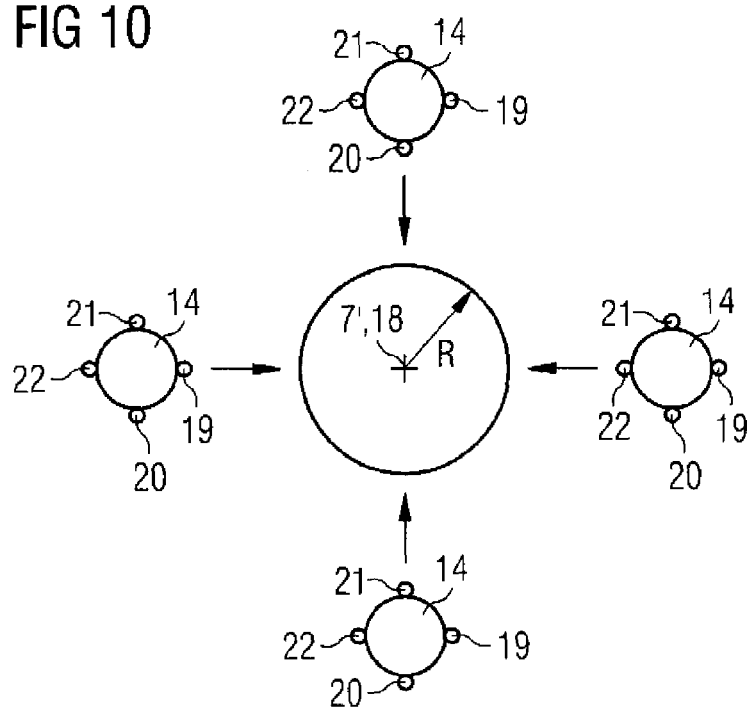
FIG. 10 shows a sectional plane.

It is also possible to combine with one another the procedures of FIGS. 7 and 8 on the one hand and of FIGS. 9 and 10 on the other hand. This case is explained in greater detail below in conjunction with FIG. 11.

Figure 11:
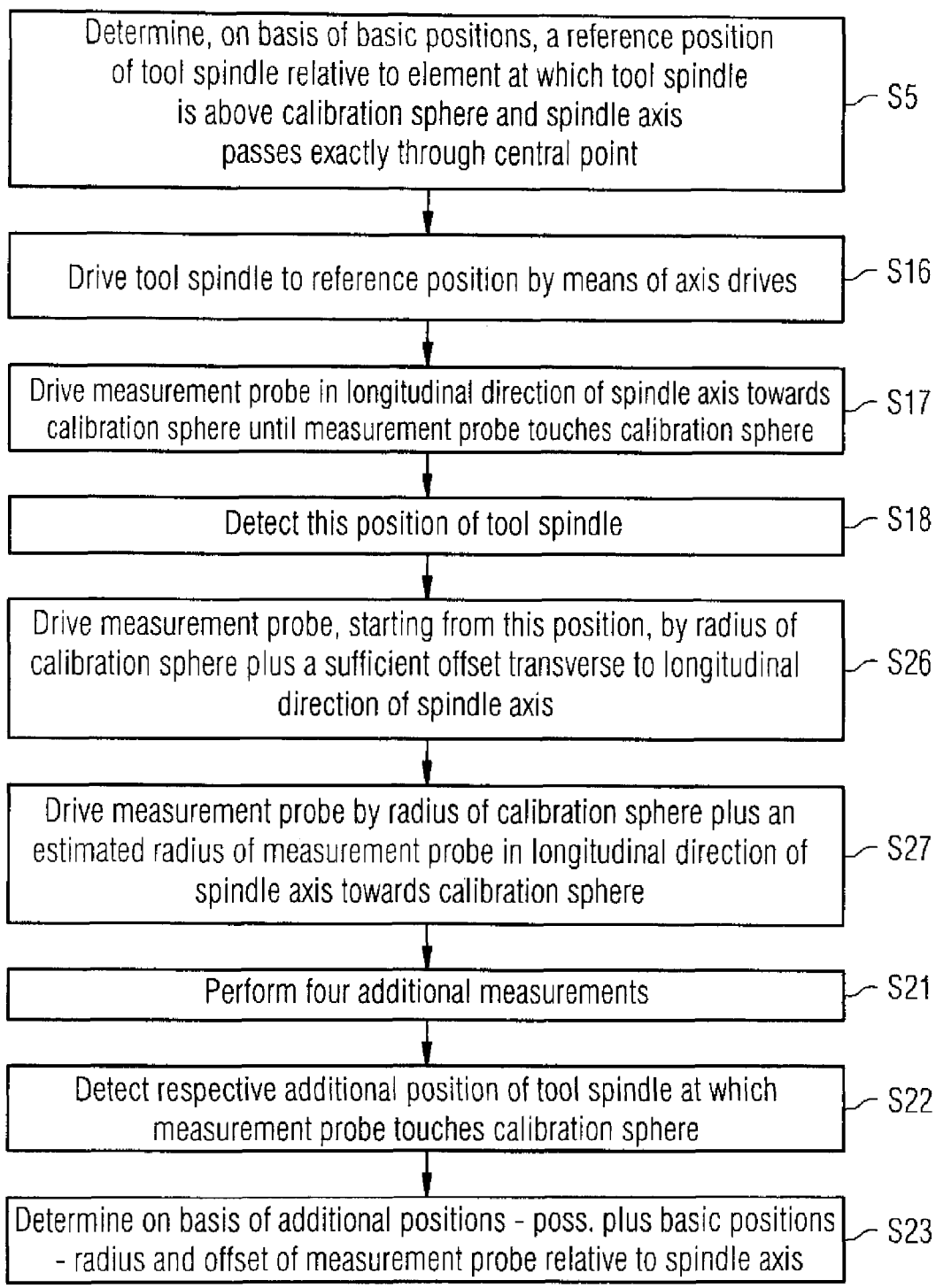
FIGS. 11 and 12 show additional flow diagrams of the calibration process according to the present invention.

In accordance with FIG. 11, initially the steps S16 and S17—possibly plus step S18—of FIG. 7 are executed. Then the measurement probe 14, in a step S26, starting from the late contact position, is driven by means of the axis drives 8x, 8y, 8z by the radius R of the calibration sphere 7 plus a sufficient offset, transverse to the longitudinal direction of the spindle axis 4. Furthermore the measurement probe 14 is driven by means of the axis drives 8x, 8y, 8z in a step S27 by the radius R of the calibration sphere 7 plus an estimated radius r of the measurement probe 14, in the longitudinal direction of the spindle axis 4 towards the calibration sphere 7. After this the steps S21 to S23 of FIG. 9 are executed. In particular the steps S21 and S22 are thus executed in that plane 16 into which the central point 14' of the measurement probe 14 was driven in step S27.

Figure 12:
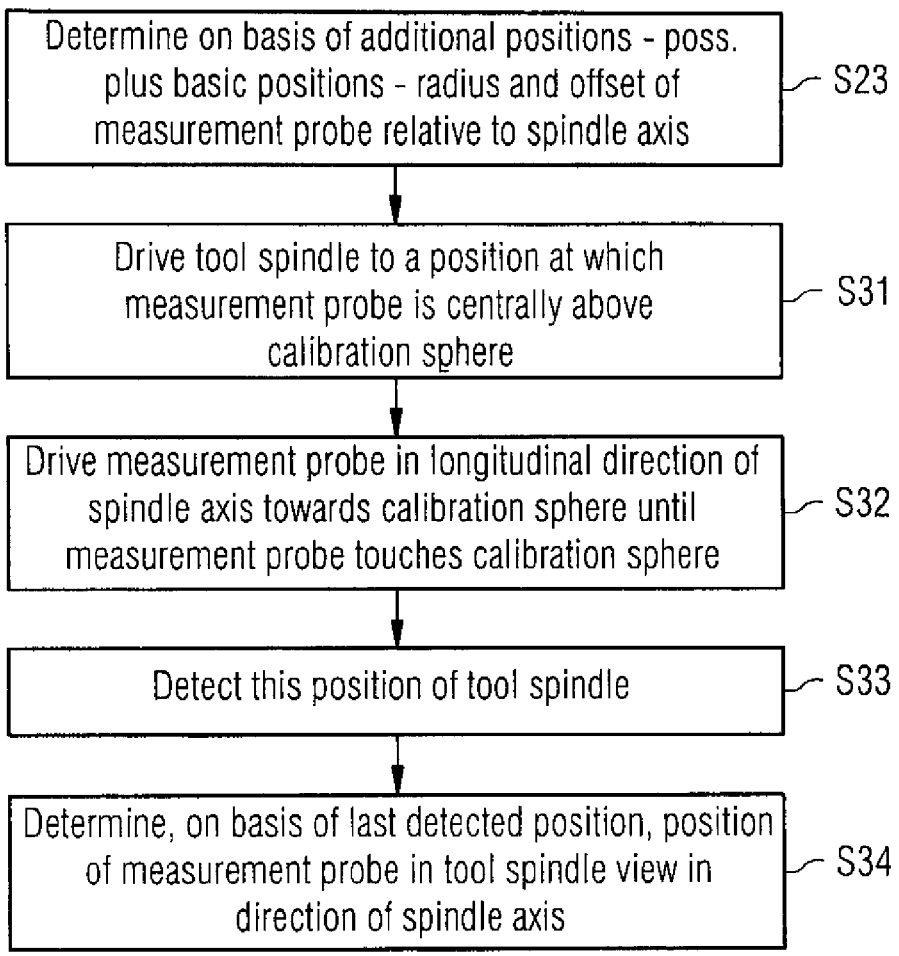
Figure 13:
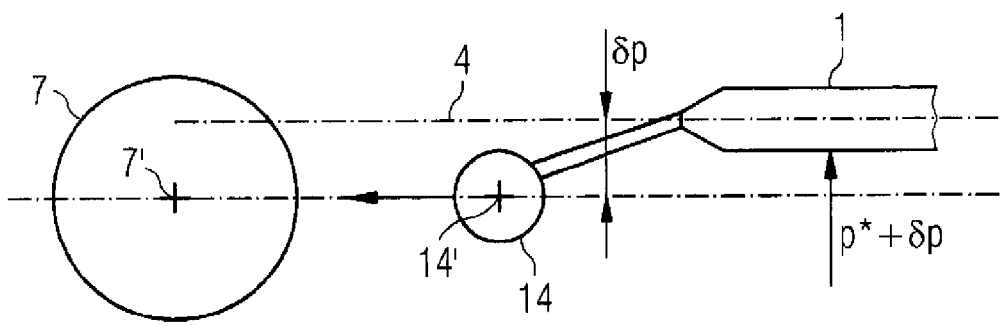
FIG. 13 shows a diagram similar to the diagram of FIG. 3.

For further calibration of the measurement probe 14, i.e. building on step S23, it is possible for example, in accordance with FIG. 12 in a step S31, to drive the tool spindle 1 to a position at which the measurement probe 14 is located centrally above the calibration sphere 7. This is now possible since not only the reference position p* is known but also the offset δp. The corresponding positioning of the measurement probe 14 is shown in FIG. 13.

Then the measurement probe 14 is driven in a step S32 in the longitudinal direction of the spindle axis 4 towards the calibration sphere 7 until the measurement probe 14 is touching the calibration sphere 7. This position p of the tool spindle 1—referred to as the last contact position below—is detected in a step S33.

In a step S34 the control device 2 determines, on the basis of the last contact position, the length L of the measurement probe 14, viewed in the direction of the spindle axis 4.

The calibration of the measurement probe described here is already very precise. It can however be enhanced even further. This will be explained in greater detail below in conjunction with FIG. 14.

Figure 14:
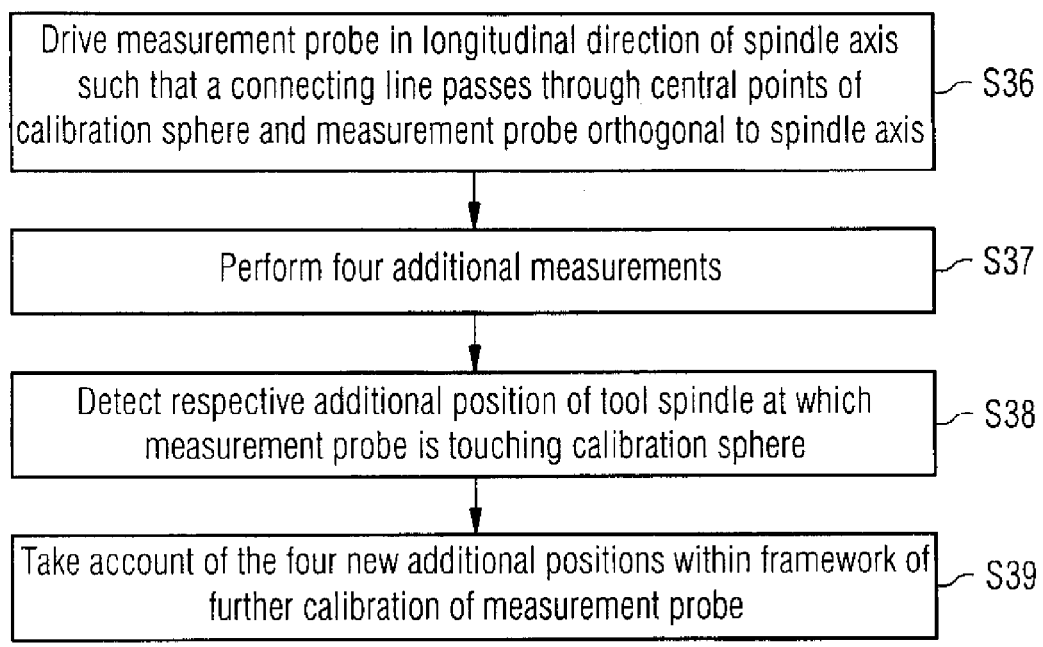
FIG. 14 shows an additional flow diagram of the calibration process according to the present invention.

In accordance with FIG. 14 steps S36 to S39 are executed between steps S23 and S31. In step S36 the measurement probe 14 will be driven by means of the axis drives 8x, 8y, 8z in the longitudinal direction of the spindle axis 4 such that a connecting line 23 (see FIG. 6), connecting the central points 7', 14' of calibration sphere 7 and measurement probe 14, runs orthogonally to spindle axis 4.

Then the steps S37 and S38 are executed. The steps S37 and S38 correspond in their content to the steps S21 and S22 of FIG. 9. As part of the steps S37 and S38 the four additional measurements are thus repeated.

In step S39 the four new additional positions are taken into account within the framework of the further calibration of the measurement probe 14. In particular—however this time with improved realism—on the basis of the four additional positions the actual radius r of the measurement probe 14 and its offset δp relative to the spindle axis 4 can be determined.

The present invention has many advantages. In particular it is easy to implement, operates reliably and delivers superior results.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for calibrating a spherical measurement probe fastened in a tool spindle of a machine tool and configured for rotation about a spindle axis, comprising the steps of:
   fastening a calibration sphere to an element of the machine tool,
   positioning the tool spindle relative to the element of the machine tool with at least three axis drives of the machine tool in three mutually independent translational directions,
   performing four basic measurements while during all four basic measurements holding the tool spindle constant at an identical longitudinal position, as viewed in a direction of the spindle axis, and holding the calibration sphere constant at the same orientation for all four basic measurements, moving in each basic measurement the measurement probe with the axis drives towards the calibration sphere in a corresponding transverse direction and measuring a corresponding basic position of the tool spindle relative to the element of the machine tool at which the measurement probe touches the calibration sphere, wherein the four transverse directions corresponding to the four basic measurements meet in a plane spanned by the four transverse directions in a common point and are evenly distributed around the common point, rotating the measurement probe with a spindle drive from one basic measurement to a next basic measurement by an identical angle about the spindle axis, wherein the identical angle corresponds to an angle between the respective transverse directions with one another, determining based on the basic positions a reference position of the tool spindle above the calibration sphere relative to the element at which the spindle axis extends through a center point of the calibration sphere, and taking the determined reference position into account in a further calibration of the measurement probe.

2. The method of claim 1, further comprising the steps of:
before the four basic measurements are performed, moving the measurement probe with the axis drives towards the calibration sphere in the longitudinal direction of the spindle axis and measuring an early contact position of the tool spindle relative to the element at which the measurement probe touches the calibration sphere, and for performing the four basic measurements, moving the measurement probe, starting from the early contact position, transversely to the longitudinal direction of the spindle axis by a known radius of the calibration sphere plus a sufficient offset, and moving the measurement probe in the longitudinal direction of the spindle axis towards the calibration sphere by a distance equal to the radius of the calibration sphere plus an estimated radius of the measurement probe.

3. The calibration method of claim 1, further comprising the steps of:
after determination of the reference position, moving the tool spindle with the axis drives to the reference position, moving the measurement probe with the axis drives in the longitudinal direction of the spindle axis towards the calibration sphere and measuring a late contact position of the tool spindle relative to the element at which the measurement probe touches the calibration sphere, and taking the late contact position into account in the further calibration of the measurement probe.

4. The method of claim 1, further comprising the steps of:
after the determination of the reference position, performing four additional measurements, in all four additional measurements, holding the calibration sphere constant with an identical orientation as for the four basic measurements, for each additional measurement, moving the measurement probe with the axis drives towards the calibration sphere in one of the four corresponding transverse directions and measuring a corresponding additional position of the tool spindle relative to the element at which the measurement probe touches the calibration sphere, in all four additional measurements, holding the measurement probe constant with the spindle drive at an identical orientation, and taking the four additional positions into account in the further calibration of the measurement probe.

5. The method of claim 4, wherein the four additional measurements are performed after determination of a late contact position, the method further comprising:
starting from the late contact position, for performing the four additional measurements, moving the measurement probe with the axis drives by the radius of the calibration sphere plus a sufficient offset transverse to the longitudinal direction of the spindle axis and moving the measurement probe in the longitudinal direction of the spindle axis towards the calibration sphere by a distance equal to the radius of the calibration sphere plus an estimated radius of the measurement probe.

6. The method of claim 4, wherein an actual radius of the measurement probe and an offset of the measurement probe relative to the spindle axis are determined based on the four additional positions.

7. The method of claim 6, further comprising the steps of:
after the determination of the actual radius and the offset of the measurement probe, moving the tool spindle with the axis drives to a position in which the measurement probe is located centrally above the calibration sphere, thereafter moving the measurement probe with the axis drives towards the calibration sphere in the longitudinal direction of the spindle axis, and measuring a most recent contact position of the tool spindle relative to the element of the machine tool at which the measurement probe touches the calibration sphere, and based on the most recent contact position, determining a length of the measurement probe as viewed in the direction of the spindle axis.

8. The method of claim 6, characterized in that,
after the determination of the actual radius and the offset of the measurement probe, moving the measurement probe with the axis drives in the longitudinal direction of the spindle axis such that a connecting line connecting a center point of measurement probe with the center point of the calibration sphere runs orthogonally to the spindle axis, repeating the four additional measurements to obtain four new additional positions, and taking the four new additional positions into account in a further calibration of the measurement probe.

9. A computer program stored on a non-transitory medium and comprising machine code which, when loaded into a control device for a machine tool and executed by the control device, causes the control device to perform a calibration method for calibrating a spherical measurement probe, which is fastened in a tool spindle of a machine tool and configured for rotation about a spindle axis, with a calibration sphere attached to an element of the machine tool, with the calibration method comprising the steps of:
positioning the tool spindle relative to the element of the machine tool with at least three axis drives of the machine tool in three mutually independent translational directions, performing four basic measurements while during all four basic measurements holding the tool spindle constant at an identical longitudinal position, as viewed in a direction of the spindle axis, and holding the calibration sphere constant at the same orientation for all four basic measurements moving in each basic measurement the measurement probe with the axis drives towards the calibration sphere in a corresponding transverse direction and measuring a corresponding basic position of the tool spindle relative to the element of the machine tool at which the measurement probe touches the calibration sphere, wherein the four transverse directions corresponding to the four basic measurements meet in a plane spanned by the four transverse directions in a common point and are evenly distributed around the common point, rotating the measurement probe with a spindle drive from one basic measurement to a next basic measurement by an identical angle about the spindle axis, wherein the identical angle corresponds to an angle between the respective transverse directions with one another, determining based on the basic positions a reference position of the tool spindle above the calibration sphere relative to the element at which the spindle axis extends through a center point of the calibration sphere, and taking the determined reference position into account in a further calibration of the measurement probe.

10. The computer program of claim 9, wherein the computer program is stored on non-transitory medium in machine-readable form.

11. The computer program of claim 10, wherein the data medium is embodied as a mobile data medium.

12. The computer program of claim 10, wherein the data medium is embodied as an integral component of the control device.

13. A control device for a machine tool, wherein the control device is programmed with a computer program stored on a non-transitory medium and comprising machine code which, when loaded into a control device for a machine tool and executed by the control device, causes the control device to perform a calibration method for calibrating a spherical measurement probe, which is fastened in a tool spindle of a machine tool and configured for rotation about a spindle axis, with a calibration sphere attached to an element of the machine tool, with the calibration method comprising the steps of:

positioning the tool spindle relative to the element of the machine tool with at least three axis drives of the machine tool in three mutually independent translational directions, performing four basic measurements while during all four basic measurements holding the tool spindle constant at an identical longitudinal position, as viewed in a direction of the spindle axis, and holding the calibration sphere constant at the same orientation for all four basic measurements moving in each basic measurement the measurement probe with the axis drives towards the calibration sphere in a corresponding transverse direction and measuring a corresponding basic position of the tool spindle relative to the element of the machine tool at which the measurement probe touches the calibration sphere, wherein the four transverse directions corresponding to the four basic measurements meet in a plane spanned by the four transverse directions in a common point and are evenly distributed around the common point, rotating the measurement probe with a spindle drive from one basic measurement to a next basic measurement by an identical angle about the spindle axis, wherein the identical angle corresponds to an angle between the respective transverse directions with one another, determining based on the basic positions a reference position of the tool spindle above the calibration sphere relative to the element at which the spindle axis extends through a center point of the calibration sphere, and taking the determined reference position into account in a further calibration of the measurement probe.

14. A machine tool, comprising:

a tool spindle, a spindle drive constructed to rotate the tool spindle around a spindle axis, an element carrying a calibration sphere, at least three axis drives for positioning the tool spindle relative to the element in three mutually independent translational directions, position sensors assigned to the axis drives and configured to detect a position of the tool spindle relative to the element, and a control device configured to perform a calibration method for calibrating the calibration sphere by:

positioning the tool spindle relative to the element of the machine tool with at least three axis drives of the machine tool in three mutually independent translational directions, performing four basic measurements while during all four basic measurements holding the tool spindle constant at an identical longitudinal position, as viewed in a direction of the spindle axis, and holding the calibration sphere constant at the same orientation for all four basic measurements moving in each basic measurement the measurement probe with the axis drives towards the calibration sphere in a corresponding transverse direction and measuring a corresponding basic position of the tool spindle relative to the element of the machine tool at which the measurement probe touches the calibration sphere, wherein the four transverse directions corresponding to the four basic measurements meet in a plane spanned by the four transverse directions in a common point and are evenly distributed around the common point, rotating the measurement probe with a spindle drive from one basic measurement to a next basic measurement by an identical angle about the spindle axis, wherein the identical angle corresponds to an angle between the respective transverse directions with one another, determining based on the basic positions a reference position of the tool spindle above the calibration sphere relative to the element at which the spindle axis extends through a center point of the calibration sphere, and taking the determined reference position into account in a further calibration of the measurement probe.

* * * * *